UNITED STATES PATENT OFFICE.

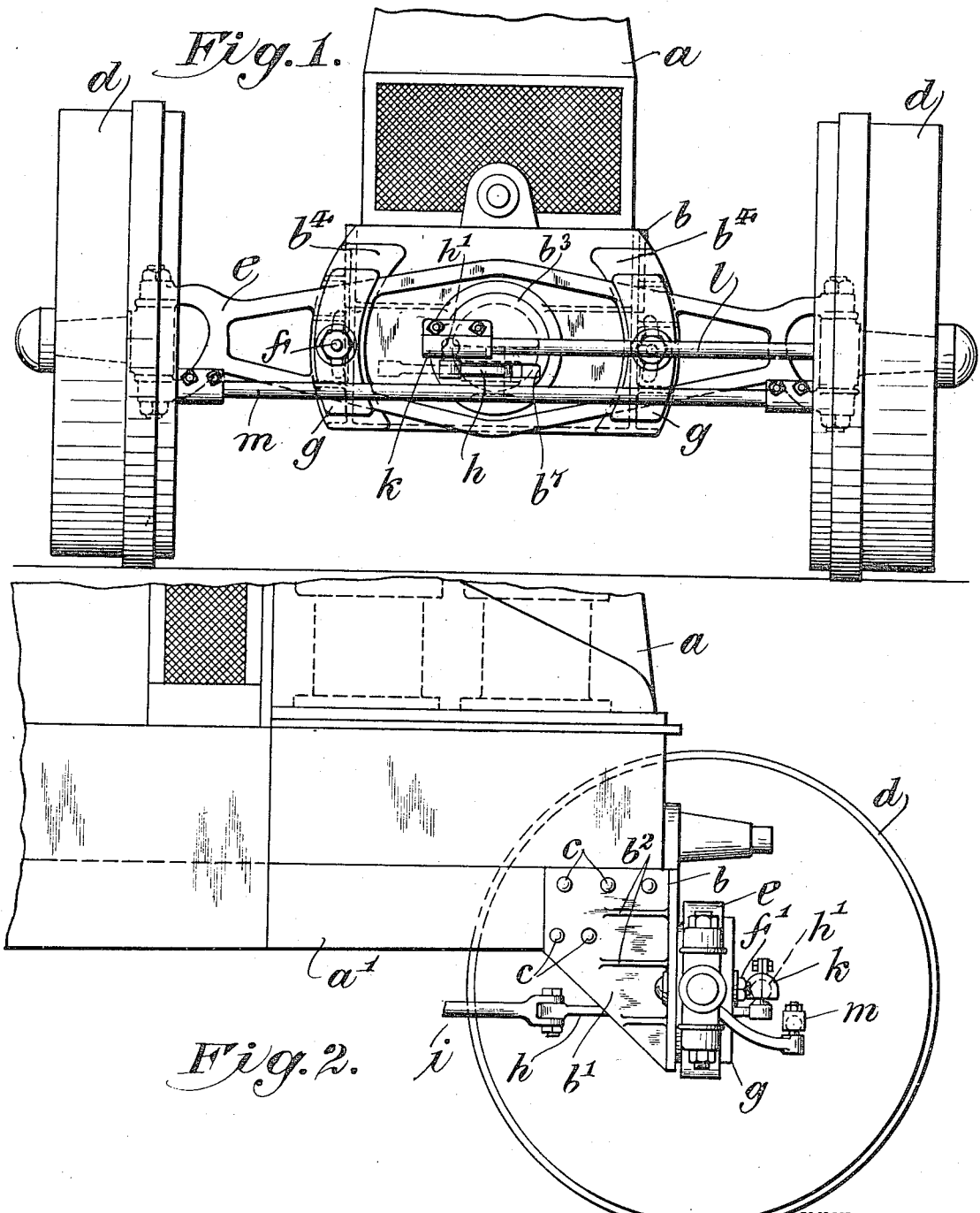

EDWARD R. HEWITT, OF MIDVALE, NEW JERSEY.

TRACTOR.

1,278,650.

Specification of Letters Patent.   Patented Sept. 10, 1918.

Application filed August 30, 1916.   Serial No. 117,585.

*To all whom it may concern:*

Be it known that I, EDWARD R. HEWITT, a citizen of the United States, residing at Midvale, Passaic county, in the State of New Jersey, have invented certain new and useful Improvements in Tractors, of which the following is a specification, reference being had to the accompanying drawings, forming a part hereof.

This invention relates to tractors and has for its principal object to improve generally the supporting devices between the main frame thereof and the front axle, and the steering mechanism by greatly simplifying such parts while increasing that ruggedness and flexibility which is essential in vehicles of the type to which the improvements are especially applicable. More particularly, the invention seeks to provide at the front end of the main frame of the tractor a one-point suspension of an extremely simple nature whereby the constant stresses incidental to the rough character of the usage to which the tractor is subjected are absorbed readily and the vital operating parts of the machine relieved to a maximum extent of injurious strains. It has previously been proposed in vehicles of various sorts to provide a three-point suspension for various units thereof but, so far as known, the main frame of a vehicle has never been connected directly to one of the supporting axles through a one-point suspension having a horizontal axis and adapted to permit free rocking movement of the frame about such axis. Not only is the frame of the improved tractor relieved of strains and movements to which it would ordinarily be subjected by constant movements of the wheels, but advantage is taken of the improved suspension to incorporate in the vehicle steering mechanism which shall be of such character as to neutralize the stresses which ordinarily would be imposed thereon by the wheels. This mechanism, it is to be noted, does not depend for its effectiveness on the combatting of stresses imposed thereon in such manner as, perhaps, to prevent the stresses from being injurious but, instead, it serves to prevent the imposition thereon of such stresses by its peculiar relation to the wheels and axle. The details of the invention will appear at greater length hereinafter in connection with the accompanying drawings, in which—

Figure 1 is a fragmentary view in front elevation of a tractor embodying the improvements.

Fig. 2 is a fragmentary view in side elevation of the tractor shown in Fig. 1.

Figure 3:
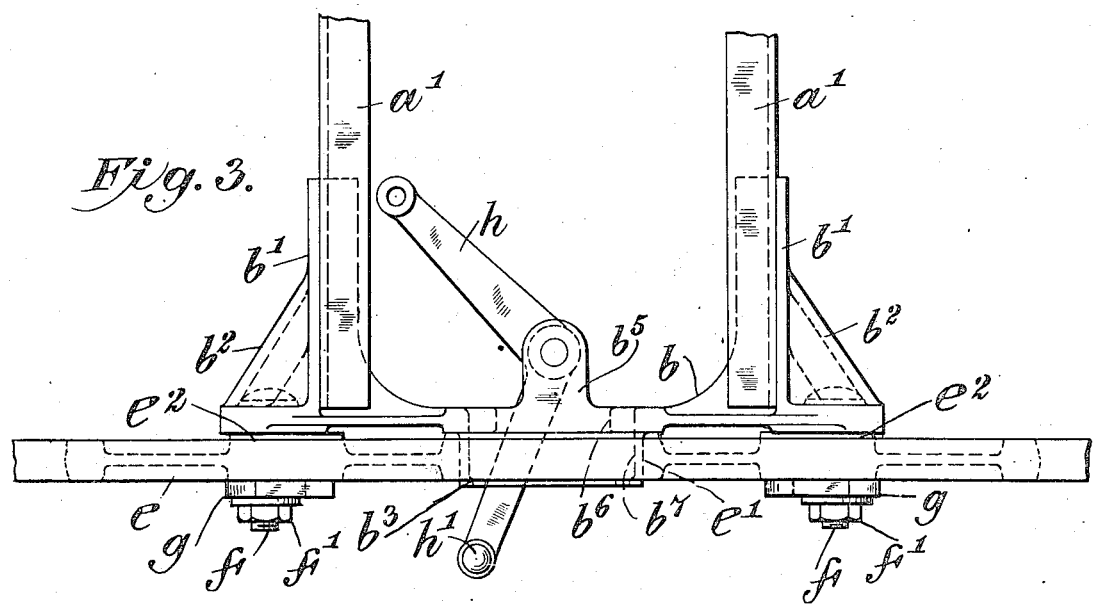
Fig. 3 is a detail view in plan and on a somewhat larger scale showing so much of the improved suspension for the frame of the tractor and the axle as is necessary for an understanding thereof.
Figure 4:
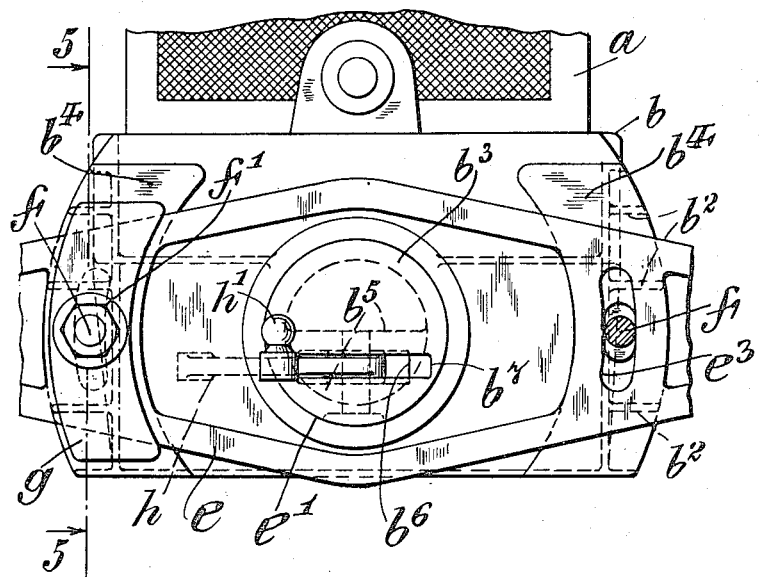
Fig. 4 is a fragmentary detail view in elevation and on a somewhat larger scale showing the relation of the axle to the improved suspension device and steering arm.
Figure 5:
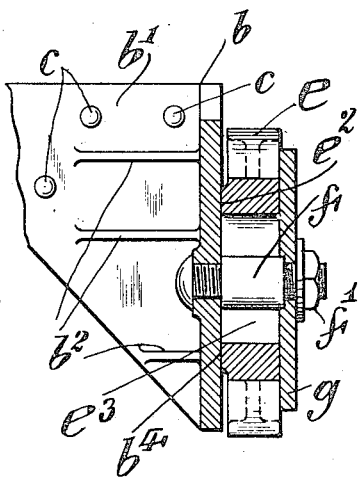
Fig. 5 is a further detail view, partly in section, taken on the plane indicated by the line 5—5 of Fig. 4 and looking in the direction of the arrows and showing particularly a satisfactory disposition of the axle with relation to the supporting bracket for the tractor frame.

The tractor $a$, which may be supposed to be of the modern internal combustion engine type, may have longitudinally extending side frame members $a'$ forming a portion of the chassis therefor and these side frame members may have secured thereto at their front ends a generally U-shaped integral frame member $b$, the two sides $b'$ of which may be suitably reinforced by webs $b^2$ and extend alongside of the side frame members $a'$ for union therewith as by suitable bolts $c$, the effect of the construction being to form a rugged chassis for the tractor. On the front face of the plate $b$ and preferably integral therewith is carried a trunnion or king bolt $b^3$, the axis of which is preferably substantially coincident with the longitudinal axis of the chassis of the tractor and formed in the manner hereinbefore described. The king bolt $b^3$ is received by the axle $e$ in a central, cylindrical opening $e'$ formed therein whereby the turning movements of the axle are around the axis of the king bolt $b^3$ and substantially around the longitudinal axis of the chassis for the tractor. It will be noted from Fig. 2 that while the axis of the king bolt is actually somewhat below the longitudinal axis of the chassis, it is evident that it is in the same plane therewith. It will also be evident that the front end of the chassis of the tractor has only a one-point suspension and is accordingly permitted to rock freely about the axis of the king bolt $b^3$. Conversely, movement of the wheels $d$ over uneven ground will cause free rocking movement of the axle about the king bolt without impressing upon the chassis of the tractor any corresponding movements or any injurious stresses. This rocking movement of the axle, as described, is permitted without injurious wear on the front plate by the axle and without a weakening of the structure at any point by a novel construction shown most clearly in Figs. 4 and 5. From these figures it appears that the front plate $b$ is provided with a plurality of wear surfaces $b^4$ against which rest corresponding wear surfaces $e^2$ provided on the proximate face of the axle and the axle and the plate are maintained in the desired relationship by means of bolts $f$ which are carried by the plate and pass through arcuate slots $e^3$ in the axle. Along the outer face of the axle there may be disposed separate wear plates $g$ to which the bolts $f$ are secured as by nuts $f'$. As described, it will be evident that rocking movement of the axle along the face of the plate $b$ will be guided constantly by the bolts $f$ and the axle maintained at all times in the desired relation to the plate $b$ by means of these bolts and the additional wear plates $g$ secured about the outer face of the axle. Not only will the wear between the several parts be of no serious moment, but the simplicity and ruggedness of the design will commend itself especially for vehicles intended for the rough usage and unskilled handling which tractors ordinarily receive.

In addition to the compensation for strains on the tractor frame by the one-point suspension described, this form of suspension permits the provision of a novel steering mechanism which shall be so mounted with relation to the supporting devices for the frame as to be movable in harmony with the axle itself, about the king bolt as an axis, and neutralize the movements and stresses tended to be impressed thereon by the vibrations of the wheels. In this improved steering mechanism it has been sought to carry out the general objects of simplicity and ruggedness which this invention contemplates and to that end the steering arm proper through which the steering movement is transmited to the steering devices proper is formed as a bell crank lever $h$ which is mounted pivotally directly on lugs $b^5$ carried on the rear face of the plate $b$. One arm of the bell crank lever $h$ may be connected to a steering rod through which the steering effort is received from any convenient source, such as a steering wheel, while the other arm extends through alined slots $b^6$ and $b^7$ formed, respectively, through the plate $b$ and the king bolt $b^3$. At the front end of the last named arm is formed a ball $h'$ which is received by a split socket $k$ carried at one end of a radius rod $l$, thereby forming an antifriction ball and socket joint between the steering arm and the radius rod. This ball and socket joint is disposed substantially along the axis of the king bolt $b^3$ and the radius rod extends laterally from this ball and socket connection and in parallelism to the axle, to the usual steering knuckle (not illustrated) at one of the wheels. The relative disposition of the radius rod $l$ with relation to the axle is best shown in Fig. 1, wherein it appears that movement of one of the wheels $d$ about the axis of the king bolt $b^3$ will cause corresponding movement of the radius rod since one end of this rod is disposed on the axis of the king bolt and the other end is secured to said wheel. The result is that movement of the wheel will have no tendency to cause axial movement of the radius rod $l$ and, accordingly, neither movement nor strain will be impressed upon said rod or any part of the steering mechanism. The two wheels $d$ will be caused to move in unison with one another through the usual laterally extending connecting link $m$ therebetween.

From the description given, it will be evident that the improved construction is simple, inexpensive, clean, rugged and most accessible for purposes of replacement or repair. Further, the operating strains on the tractor proper and on the steering mechanism thereof have been reduced to a minimum by the form of suspension and the relative disposition of the parts employed.

Reference is to be had to the appended claims for a clear definition of the scope of the invention.

I claim as my invention:

1. In a tractor, in combination with the side frame members, a front end member and a front axle, a horizontal king bolt carried by the front end member to support the front axle on a horizontal axis, a steering arm mounted on the front end member and projected through a horizontal slot in the king bolt and a link connected operatively with one of the steering wheels and with said steering arm.

2. In a tractor, in combination with the side frame members and the front axle, a separate plate secured to the side frame members at the front ends thereof, a horizontal king bolt carried on the plate and having its axis in the same plane with the horizontal axis of the frame of the tractor, a socket formed in the axle to receive the king bolt, a steering arm carried on the plate and passing through the king bolt and a steering link connected operatively to one of the wheels and secured pivotally to the steering arm at a point substantially along the axis of the king bolt.

This specification signed this 29th day of Aug. A. D. 1916.

EDWARD R. HEWITT.